(12) United States Patent
Yadav

(10) Patent No.: US 10,637,062 B2
(45) Date of Patent: Apr. 28, 2020

(54) IONIC AND ELECTRONIC CONDUCTIVE BINDER IN THICK ELECTRODES

(71) Applicant: Nissan North America, Inc., Franklin, TN (US)

(72) Inventor: Rameshwar Yadav, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 143 days.

(21) Appl. No.: 15/905,424

(22) Filed: Feb. 26, 2018

(65) Prior Publication Data

US 2019/0267628 A1     Aug. 29, 2019

(51) Int. Cl.
*H01M 4/62*     (2006.01)
*H01M 4/36*     (2006.01)
*H01M 4/02*     (2006.01)

(52) U.S. Cl.
CPC ........... *H01M 4/622* (2013.01); *H01M 4/366* (2013.01); *H01M 4/624* (2013.01); *H01M 2004/021* (2013.01)

(58) Field of Classification Search
CPC ...... H01M 4/622; H01M 4/624; H01M 4/621; H01M 4/366; H01M 2004/021; H01M 4/5815
See application file for complete search history.

(56) References Cited

U.S. PATENT DOCUMENTS

2015/0287992 A1* 10/2015 Osaka ..................... H01M 4/62
                                                 429/218.1
2017/0207492 A1* 7/2017 Adams .................. H01M 4/485

FOREIGN PATENT DOCUMENTS

JP       2017174539 A    9/2017
WO    2017087365 A1   5/2017

OTHER PUBLICATIONS

Li et al. "Understanding the Role of Different Conductive Polymers in Improving the Nanostructured sulfur Cathode Performance." Nano Lett. 2013, 13, 5534-5540 (Year: 2013).*
Rivnay et al. "Structural control of mixed ionic and electronic transport in conducting polymers." Nature Communications 7, 11287 (2016) (Year: 2016).*

* cited by examiner

*Primary Examiner* — Michael L Dignan
(74) *Attorney, Agent, or Firm* — Young Basile Hanlon & MacFarlane, P.C.

(57) ABSTRACT

An electrode for an electrochemical device has a current collector, an electrolyte layer, and an active material layer between the current collector and the electrolyte layer comprising active material. The active material layer has a first sub-layer in contact with the electrolyte layer, the first sub-layer having only an electronically conductive polymer binder as a binder material; a second sub-layer in contact with the current collector, the second sub-layer having only an ionically conductive polymer binder as the binder material; and a mid-layer between the first sub-layer and the second sub-layer.

20 Claims, 3 Drawing Sheets

US 10,637,062 B2

IONIC AND ELECTRONIC CONDUCTIVE BINDER IN THICK ELECTRODES

TECHNICAL FIELD

This disclosure relates to thick battery electrodes and an ionic and electronic conductive binder for use in such electrodes.

BACKGROUND

The electrodes of batteries and other electrochemical energy storage devices are composed of active particles, conductive agents, and a polymer binder. The active particles are loose, fragile powder that need some support to hold them together to form a contiguous structure. Binder materials are responsible for holding the active material particles together within the electrode so that a strong connection between the electrode and the contacts is maintained. These conventional polymer binders are just that—binders. The conventional polymer binders are insulators, lack any ionic and electrical conductivity, are inert, and make no contribution towards the mass and volumetric capacity, energy density, and power density of the electrochemical devices. The weight and volume of the binder in the electrode is significant. Due to need to use these inert binders and conductive agents, the weight of active material cannot be increased beyond certain value, further limiting the mass and volumetric capacity of the electrochemical devices.

SUMMARY

Disclosed herein are embodiments of electrodes and electrochemical devices having the electrodes disclosed herein.

An embodiment of an electrode for an electrochemical device as disclosed herein has a current collector, an electrolyte layer, and an active material layer between the current collector and the electrolyte layer. The active material layer comprises active material. The active material layer has a first sub-layer in contact with the electrolyte layer, the first sub-layer having only an electronically conductive polymer binder as a binder material; a second sub-layer in contact with the current collector, the second sub-layer having only an ionically conductive polymer binder as the binder material; and a mid-layer between the first sub-layer and the second sub-layer.

Another embodiment of an electrode for an electrochemical device comprises an active material layer having a first sub-layer, a second sub-layer and a mid-layer between the first sub-layer and the second sub-layer. Each of the first sub-layer, second sub-layer and mid-layer have active material. The first sub-layer has only an electronically conductive polymer binder as a binder material, and the second sub-layer has only an ionically conductive polymer binder as the binder material and ionically conductive tubing in the second sub-layer with ends of the ionically conductive tubing configured to extend into an electrolyte layer.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
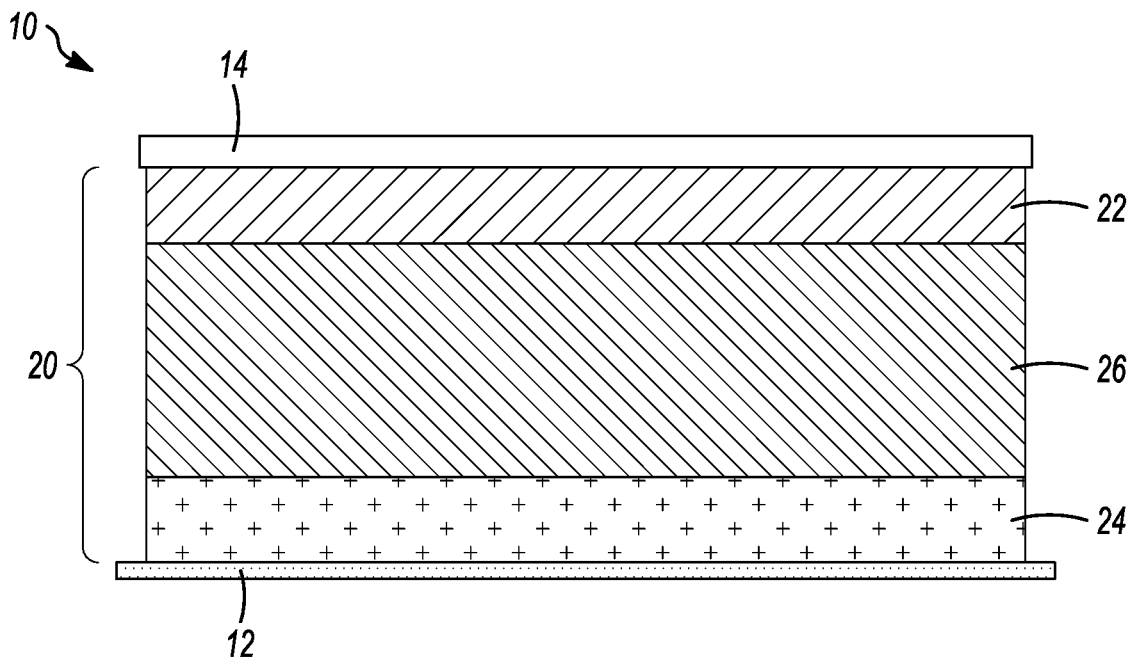
FIG. 1 is a cross-sectional view of an electrode as disclosed herein.

The electrodes of batteries and other electrochemical energy storage devices are composed of active particles, conductive agents, and polymer binders. The active particles are loose, fragile powder that require support to hold them together to form a contiguous structure. The active particles also need to be cast into a layer onto a current collector, typically a foil sheet of aluminum or copper. The stability of the electrodes, especially from swelling and contracting due to movement of ions during charge and discharge, is dependent on the binder. Polymer binders are responsible for holding the active material particles together to form a layer and to maintain a strong connection between the electrode and the current collector. As a non-limiting example, in silicon-based electrodes where the silicon particles undergo large volume changes, these binders fail to provide electrical contact between active silicon particles, the conductive agent, and the current collector. To enhance the integrity of silicon-based and other electrodes that undergo swelling and contracting, an electrically conductive polymer binder is needed to fulfill the role of maintaining the electrode structure and integrity as well as providing electrical pathways.

Conventional binders include carboxymethyl cellulose (CMC), styrene butadiene rubber (SBR), polyvinylidene fluoride (PVDF), poly(vinylidene fluoride-hexafluoropropylene) (PVDF-HFP), polyacrylic acid (PAA), polyvinylpyrrolidone (PVP), polyethylenimine (PEI), and lithium polyacrylate. CMC and SBR are water-based binders while some binders, such as PVDF, require a solvent such as n-methyl-2-pyrrolidone (NMP), which is an environmentally hazardous solvent. The active materials, conductive agents, and polymer binders are mixed together via various methods to form a homogeneous slurry. This slurry is coated onto the current collector and dried to remove solvents and then pressed to form a smooth and uniform layer.

Conventional polymer binders are insulators, lack any ionic and electrical conductivity, are inert, and make no contribution towards the mass and volumetric capacity, energy density, and power density of the electrochemical device. The amount of polymer binder in the electrode is significant. Generally, the electrode contains up to 1-8 wt. % polymer binder and 1-5 wt. % conductive agents. The weight of active materials in the electrode is therefore limited due to the need for polymer binder and conductive agents. This limits the mass and volumetric capacity of batteries and other energy storage electrochemical devices.

Currently, the thickness of electrodes must be below about 60 microns to maintain an acceptable ohmic resistance in the electrode. To meet the mass energy density (kWh/g) and volumetric energy density (kWh/L) needs of the devices, large numbers of cells are needed because each cell carries low loading (mg/cm$^2$) of active material due to the limitations on thickness of the electrodes. These large numbers of cells add to the total cost of the electrochemical device due to, for example, cost of accessories, supporting materials, components, and parts that increase in proportion with the number of cells. Large numbers of cells in an electrochemical device also increase the failure probability and can lead to compromising the reliability of the battery pack. For safer and more cost-effective electrochemical devices, there is a need to reduce the number of cells in per kWh by making each cell thicker.

To provide thicker electrodes, an electrically conductive polymer binder and an ionically conductive polymer binder are selectively used in the active material layer of the electrodes disclosed herein. Additionally, the use of ion conducting tubing in the active material layer to reduce the ohmic resistance and ionic resistance in thick electrodes is also disclosed.

FIG. 1 illustrates an embodiment of an electrode 10 for an electrochemical device as disclosed herein. The electrode 10 has a current collector 12, an electrolyte layer 14, and an active material layer 20 between the current collector 12 and the electrolyte layer 14. The active material layer 20 comprises active material. The active material layer 20 has a first sub-layer 22 in contact with the electrolyte layer 14, a second sub-layer 24 in contact with the current collector 12, and a mid-layer 26 between the first sub-layer 22 and the second sub-layer 24.

Electrodes can be anodes and include as active material one or a combination of graphite, graphene, silicon, and lithium transition oxides (LTOs), as non-limiting examples. Electrodes can be cathodes and include as active material one or a combination of lithium cobalt oxide (LCO), nickel cobalt aluminum (NCA), nickel manganese cobalt (NMC), lithium manganese oxide (LMO), lithium manganese nickel oxide (LMNO) and lithium iron phosphate (LFP), lithium-transition metal phosphate compounds, and lithium-transition metal sulfate compounds as non-limiting examples.

The first sub-layer 22, in addition to having active material, has only an electronically conductive polymer binder as a binder material. In other words, one binder material is used in the first sub-layer, and that binder material is an electronically conductive polymer binder that conducts electrons as well as binds the active material together to form the first sub-layer 22. Because the binder material is electron conducting, no conductive agent is needed. Accordingly, the first sub-layer 22 can consist of active material and electronically conductive polymer binder. The first sub-layer 22 in the active material layer 20 is the furthest from the current collector 12, which provides electrons through the active material layer 20. Using the electronically conductive polymer binder in the first sub-layer 22 furthest from the current collector 12 provides a boost in electron conduction while replacing the conductive agent typically used in active material layers.

The electronically conductive polymer binder can be poly(3,4-ethylenedioxythiophene) doped with poly(styrene sulfonate) (PEDOT:PSS), polypyrrol, polyanilines (PANI), polypyrenes, poly(thiophenes), and polyphenylene sulfide (PPS). PEDOT:PSS is gel polymer dispersed in water and can be used to mix the active materials. PEDOT:PSS functions as the binding material to hold active materials together, providing structural support in the electrode and forming a contiguous layer. The conductivity of the electrode incorporating PEDOT:PSS as an electronically conductive polymer binder can be greatly increased by post-treatment with solvents such as methanol, DMSO, ethylene glycol, other alcohols, germinal alcohols, NMP or any other solvents known to those skilled in the art to boost the electrical conductivity of PEDOT:PSS.

The second sub-layer 24, in addition to having active material, has only an ionically conductive polymer binder as the binder material. In other words, one binder material is used in the second sub-layer 24, and that binder material is an ionically conductive polymer binder that conducts lithium ions as well as binds the active material together to form the second sub-layer 24. Because the second sub-layer 24 is next to the current collector 12, conductive agent is not necessary in this layer 24. Accordingly, the second sub-layer 24 can consist of active material and ionically conductive polymer binder. However, conductive agent can be used if desired.

The second sub-layer 24 is furthest from the electrolyte layer 14 and conventionally suffers from high ohmic resistance, the resistance increasing as the electrode thickness increases. Using an ionically conducting polymer binder at this area in the active material layer 20 assists in lithium ion transport, reducing the ohmic resistance and enabling a thicker active material layer 20.

Lithiated $C_7HF_{13}O_5S.C_2F_4$ (Lithiated-Nafion™), lithiated-perfluorosulfonic acid (Li-PFSA), single acid or multi-acid lithiated perfluoro imide acid (Li-PFIA) or other lithiated multi-acid ionomers can be used as the ionically conducting polymer binder. All materials meet the voltage, oxidative and electrochemical stability requirement of the battery electrodes. Nafion™ ionomer, PFSA or PFIA can be ion-exchanged with LiOH to convert them into lithiated-Nafion™, lithiated-PFSA, or lithiated-PFIA. These ionomers are characterized with different equivalent weights (EW). The EW selection of lithiated ionomer will depend on the degree of lithium ion conductivity needed in the electrode. The low EW ionomer as well as multi-acid ionomer can provide higher lithium ion conductivity in the electrode.

The mid-layer 26 includes active material and electronically conducting polymer binder, similar to the first sub-layer 22. No conductive agent is needed due to the electronically conducting polymer. The mid-layer 26 can also include ionically conducting polymer to assist in lithium ion transport, further reducing ohmic resistance and enabling a thicker active material layer 20. The first sub-layer 22 has a higher concentration of the electronically conductive polymer binder than a concentration of the electronically conductive polymer binder in the mid-layer 26 and the second sub-layer 24 has a higher concentration of the ionically conductive polymer binder than a concentration of the ionically conductive polymer binder in the mid-layer 26. The concentration of electronically conductive polymer binder in each layer is selected to provide substantially uniform electrical conductivity across the thickness of the electrode. The concentration of ionically conductive polymer binder in each layer is selected to provide substantially uniform ionic conductivity, ranging from 1 to 50 mS/cm, across the thickness of the electrode.

Figure 2:
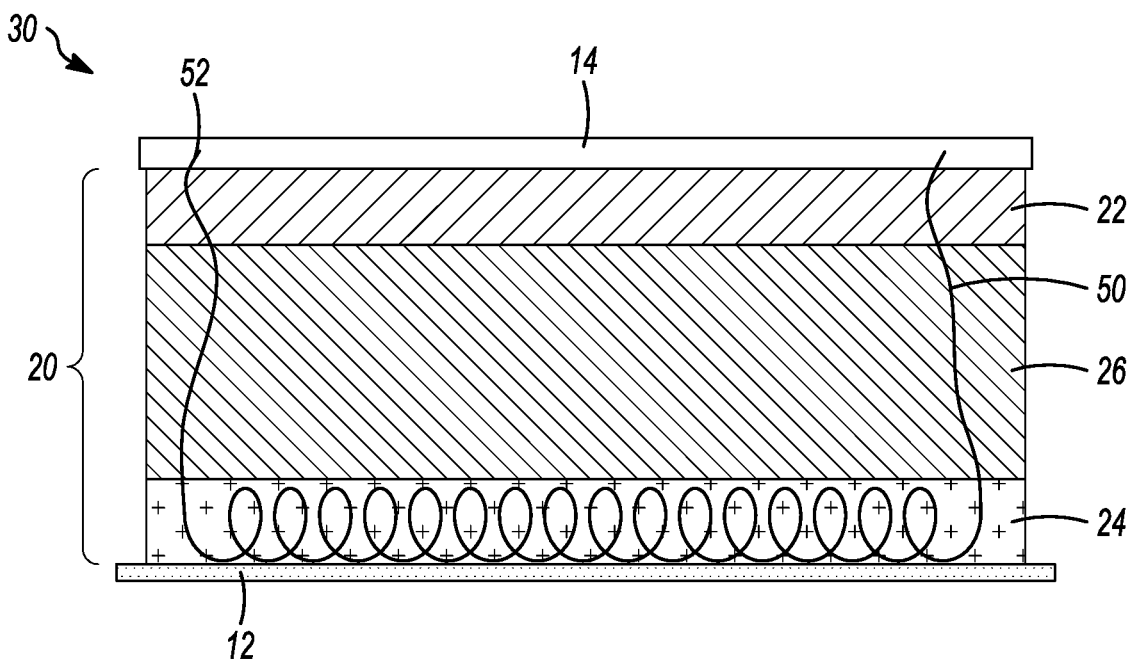
FIG. 2 is a side view of another electrode as disclosed herein.
Figure 3:
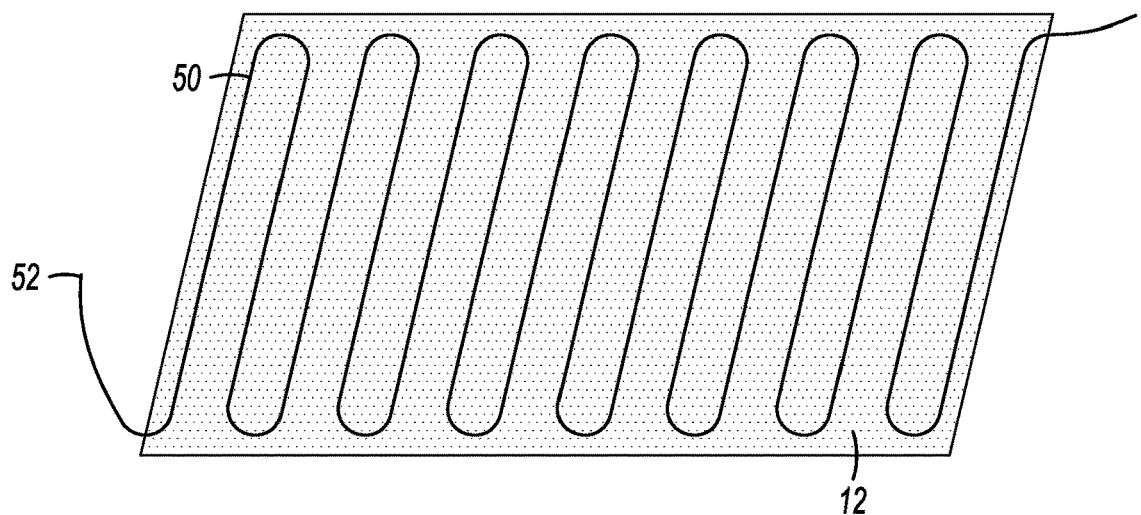
FIG. 3 is a plan view of an electrolyte extender on a current collector.
Figure 4:
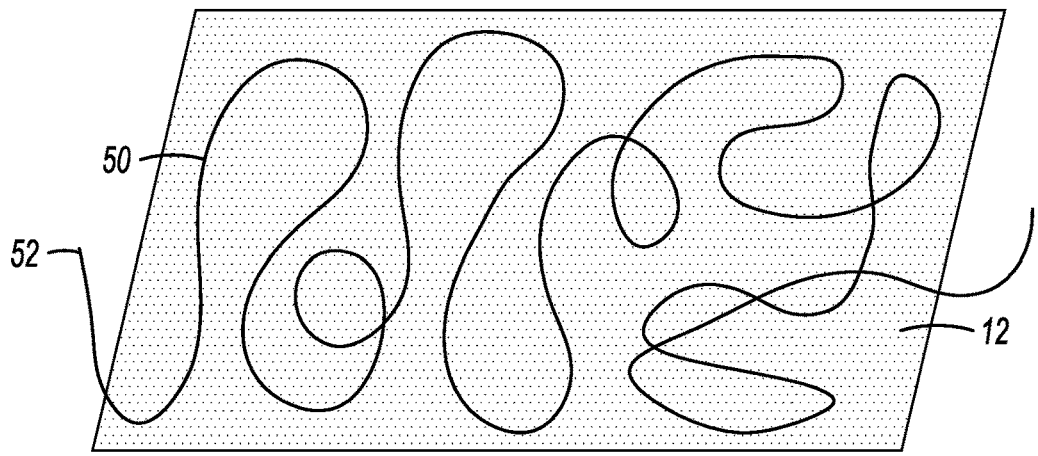
FIG. 4 is a plan view of another electrolyte extender on a current collector.

In another embodiment of an electrode 30 for an electrochemical device as illustrated in FIG. 2, an ionically conducting electrolyte extender can be used. The electrode 30 of FIG. 2 is the same as that of FIG. 1, except that ionically conducting electrolyte extender 50 is used in the second sub-layer 24 to further improve lithium ion transport. As shown in FIG. 2, the ionically conducting electrolyte extender 50 can be positioned between the current collector 12 and the second sub-layer 24. The electrolyte extender 50 can be laid out on the current collector 12 prior to forming the active material layer 20 on the current collector 12. The electrolyte extender 50 can be positioned along the current collector 12 in any pattern or randomly along the surface area of the current collector 12, as illustrated two-dimensionally in FIGS. 3 and 4. The electrolyte extender 50 can lie primarily against the current collector 12, conducting ions from the electrolyte layer 14 and across the surface area of the second sub-layer 24 and can be more three-dimensional, rising in some or all portions into the second sub-layer 24. After the active material layer 20 is formed on the current collector 12, the electrolyte extender 50 may rise into the second sub-layer 24 prior to the layer being fully dried. The ends 52 of the electrolyte extender 50 extend into the electrolyte layer 14, providing a path for lithium ions from the electrolyte layer 14, along the electrolyte extender 50 and into the second sub-layer 24.

Figure 5:
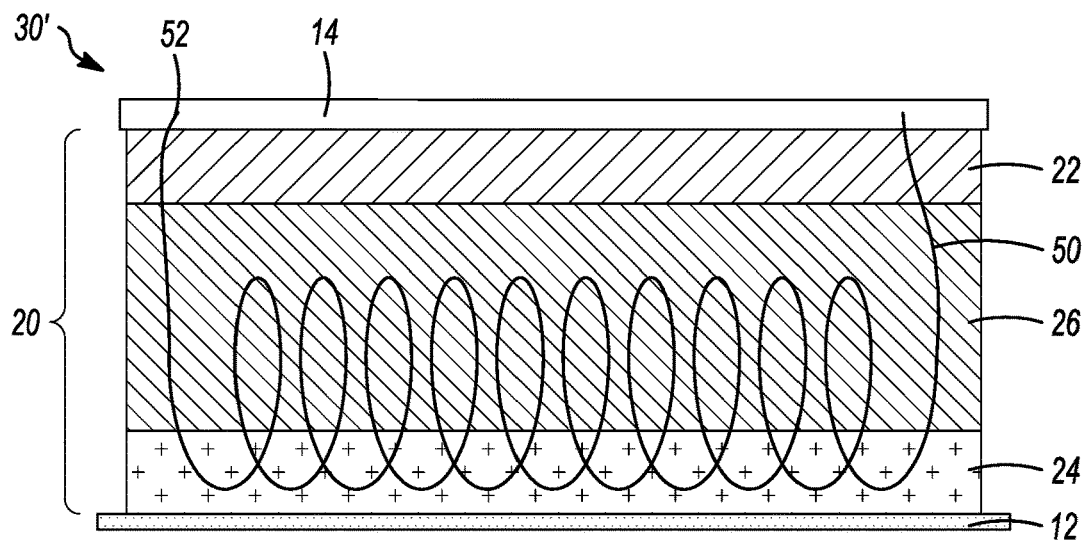
FIG. 5 is a side view of another electrode as disclosed herein.

The electrolyte extender 50 can also extend through some or all of the mid-layer 26. As illustrated in the electrode 30' in FIG. 5, the electrolyte extender 50 extends into a majority of the mid-layer 26 in a random, "spaghetti-like" pattern. This is a non-limiting example of how the electrolyte extender 50 can be extended through the mid-layer 26. If the mid-layer 26 includes the electrolyte extender 50, no ionically conducting polymer binder or a significantly smaller concentration of ionically conducting polymer binder is necessary in the mid-layer 26. The concentration of ionically conductive polymer binder in each layer is selected to provide substantially uniform ionic conductivity, ranging from 1 to 50 mS/cm, across the thickness of the electrode, including the ionic conductivity provided by the electrolyte extender 50.

The ionically conductive electrolyte extender 50 can be lithiated-Nafion™ tubing, lithiated-PFSA tubing, or lithiated-PFIA tubing. The tubing can be hollow, with the tubing wall thickness between about 5 microns and 50 microns, inclusive and the inner diameter between about 5 microns and 50 microns, inclusive. The inner diameter and wall thickness can also vary with the mechanical integrity of the tubing in which the tubing should be strong enough to maintain its inner hollow space under electrode stress and operation. The tubing inner diameter, wall thickness and outer diameter can also vary with electrode thickness, wherein thicker electrodes, such as electrodes with a thickness of greater than 600 microns, can use the larger dimensioned tubing. Alternatively, the ionically conductive electrolyte extender 50 can be a highly porous filament, or long, flexible wire, of lithiated-Nafion™, lithiated-PFSA, or lithiated-PFIA, similar to the tubing but solid. The electrolyte extender 50 can be stretched to obtain the desired inner diameter, wall thickness, outer diameter, or porosity. The electrolyte extender 50 can be a single piece of sufficient length or can be more than one piece so long as the extender ends 52 are in contact with the electrolyte layer 14 for continuous transport of the electrolyte to the second sub-layer 24 and mid-layer 26. The ionically conductive electrolyte extender 50 transports electrolyte via ion-exchange because the walls of the extender 50 are ionic in nature and can transport all the component of the electrolyte. The electrolyte layer 14 can be a liquid electrolyte, a gel electrolyte or a polymer electrolyte known to those skilled in the art. As examples, the liquid electrolyte may be in the form of a solution in which a lithium salt is dissolved in an organic solvent. The gel electrolyte may be in the form of a gel in which the above-mentioned liquid electrolyte is impregnated into a matrix polymer composed of an ion conductive polymer. Electrolyte material is not limited and can be electrolytes known to those skilled in the art, such as $LiPF_6$ salt, ethylene carbonate, propylene carbonate, diethyl carbonate, and others. When the electrolyte layer 14 is formed by a liquid electrolyte or gel electrolyte, a separator may be used in the electrolyte layer. Examples of the separators are porous films of polyolefin such as polyethylene and polypropylene.

Figure 6:
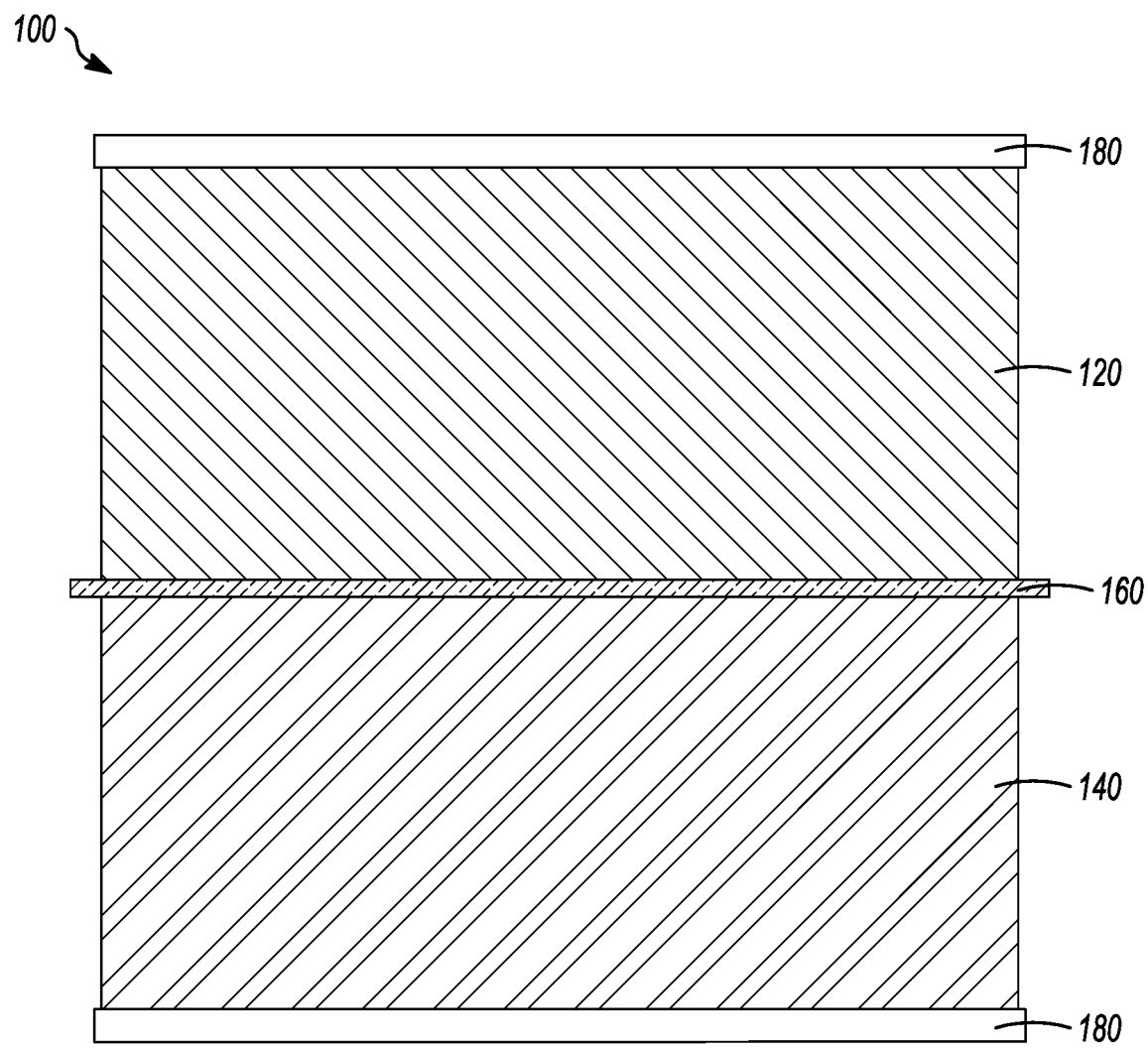
FIG. 6 is a side view of a cell of an electrochemical device as disclosed herein.

Also disclosed are electrochemical devices having the electrodes 10, 30 disclosed herein. Depending on the active material used, the cathode electrode may include an embodiment disclosed herein, the anode electrode may include an embodiment disclosed herein, or both electrodes may include an embodiment as disclosed herein. As a non-limiting example, a lithium-ion battery includes a plurality of unit cell layers. A unit cell layer 100 is illustrated in FIG. 6. Each unit cell layer 100 includes a cathode active material layer 120 and an anode active material layer 140. The cathode active material layer 120 is formed on one surface of a current collector 160 and is electrically connected thereto and the anode active material layer 140 is formed on the other surface of the current collector 160 and electrically connected thereto. Each of the electrolyte layers 180 includes a separator serving as a substrate and an electrolyte supported by the separator. The current collector 160 is composed of a conductive material serving as a joining member for electrically connecting the active material layers to the outside.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An electrode, comprising:
   a current collector;
   an electrolyte layer; and
   an active material layer between the current collector and the electrolyte layer comprising active material, wherein the active material layer has:
      a first sub-layer in contact with the electrolyte layer, the first sub-layer having only an electronically conductive polymer binder as a binder material;
      a second sub-layer in contact with the current collector, the second sub-layer having only an ionically conductive polymer binder as the binder material, wherein the ionically conductive polymer binder is a lithiated material and is different than the electronically conductive polymer binder; and
      a mid-layer between the first sub-layer and the second sub-layer.

2. The electrode of claim 1, wherein the electronically conducting polymer binder is PEDOT:PSS.

3. The electrode of claim 1, wherein the ionically conducting polymer binder is lithiated $C_7HF_{13}O_5S.C_2F_4$, lithiated PFSA, or lithiated PFIA.

4. The electrode of claim 1, further comprising:
   ionically conductive tubing in the second sub-layer with ends of the ionically conductive tubing extending into the electrolyte layer.

5. The electrode of claim 4, wherein the ionically conducting tubing is made from lithiated $C_7HF_{13}O_5S.C_2F_4$, lithiated PFSA, or lithiated PFIA.

6. The electrode of claim 4, wherein the ionically conductive tubing extends across a majority of a width and a length of the second sub-layer.

7. The electrode of claim 4, wherein the ionically conductive tubing extends into the mid-layer.

8. The electrode of claim 7, wherein the ionically conductive tubing continuously and randomly winds through the second sub-layer and the mid-layer.

9. The electrode of claim 7, wherein the mid-layer comprises only electronically conductive polymer binder as binder material.

10. The electrode of claim 9, wherein the first sub-layer has a higher concentration of the electronically conductive polymer binder than a concentration of the electronically conductive polymer binder in the mid-layer.

11. The electrode of claim 1, wherein the mid-layer comprises both the electronically conductive polymer binder and the ionically conductive polymer binder as the binder material.

12. The electrode of claim 1, wherein the active material layer has a thickness of between 100 microns and 1000 microns.

13. The electrode of claim 1, wherein the active material layer has no conductive agent in addition to the electronically conducting polymer binder.

14. An electrochemical device, comprising the electrode of claim 1 as a cathode.

15. An electrochemical device, comprising the electrode of claim 1 as an anode.

16. An electrode, comprising:
a current collector;
an electrolyte layer; and
an active material layer between the current collector and the electrolyte layer comprising active material, wherein the active material layer has:
a first sub-layer in contact with the electrolyte layer, the first sub-layer having only an electronically conductive polymer binder as a binder material;
a second sub-layer in contact with the current collector, the second sub-layer having only an ionically conductive polymer binder as the binder material; and
a mid-layer between the first sub-layer and the second sub-layer, wherein the mid-layer comprises both the electronically conductive polymer binder and the ionically conductive polymer binder as the binder material, the first sub-layer has a higher concentration of the electronically conductive polymer binder than a concentration of the electronically conductive polymer binder in the mid-layer and the second sub-layer has a higher concentration of the ionically conductive polymer binder than a concentration of the ionically conductive polymer binder in the mid-layer.

17. An electrode, comprising:
an active material layer having a first sub-layer, a second sub-layer and a mid-layer between the first sub-layer and the second sub-layer, each of the first sub-layer, second sub-layer and mid-layer having active material, and wherein:
the first sub-layer has only an electronically conductive polymer binder as a binder material; and
the second sub-layer has only an ionically conductive polymer binder as the binder material and ionically conductive tubing in the second sub-layer with ends of the ionically conductive tubing configured to extend into an electrolyte layer.

18. The electrode of claim 17, wherein the electronically conducting polymer binder is PEDOT:PSS and the ionically conducting polymer binder is lithiated $C_7HF_{13}O_5S.C_2F_4$, lithiated PFSA, or lithiated PFIA.

19. The electrode of claim 17, wherein the ionically conductive tubing extends into the mid-layer.

20. The electrode of claim 17, wherein the active material layer has no conductive agent in addition to the electronically conducting polymer binder.

* * * * *